(12) United States Patent
Uesugi et al.

(10) Patent No.: US 10,773,567 B2
(45) Date of Patent: Sep. 15, 2020

(54) ECOLOGICAL VEHICLE AIR CONDITIONER EVALUATION DEVICE

(71) Applicants: DENSO CORPORATION, Kariya, Aichi-pref. (JP); TOYOTA JIDOSHA KABUSHIKI KAISHA, Toyota-shi, Aichi-ken (JP)

(72) Inventors: Yoshihiko Uesugi, Kariya (JP); Kazuya Nishiuma, Kariya (JP); Takayuki Kamada, Kariya (JP); Daisuke Setoguchi, Aichi-gun (JP); Takashi Ogawa, Toyota (JP); Seiji Tanaka, Toyota (JP)

(73) Assignees: DENSO CORPORATION, Kariya, Aichi-pref. (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 222 days.

(21) Appl. No.: 15/770,344

(22) PCT Filed: Sep. 12, 2016

(86) PCT No.: PCT/JP2016/076790
§ 371 (c)(1),
(2) Date: Apr. 23, 2018

(87) PCT Pub. No.: WO2017/073186
PCT Pub. Date: May 4, 2017

(65) Prior Publication Data
US 2018/0312037 A1 Nov. 1, 2018

(30) Foreign Application Priority Data
Oct. 26, 2015 (JP) .................................. 2015-209701

(51) Int. Cl.
*B60H 1/00* (2006.01)
*B60K 23/00* (2006.01)
(Continued)

(52) U.S. Cl.
CPC ....... *B60H 1/00964* (2013.01); *B60H 1/0073* (2019.05); *B60H 1/00735* (2013.01);
(Continued)

(58) Field of Classification Search
CPC .............. B60H 1/00964; B60H 1/0073; B60H 1/00735; B60H 1/00764; B60H 1/00985;
(Continued)

(56) References Cited

U.S. PATENT DOCUMENTS 8,442,752 B2 * 5/2013 Wijaya ............... B60H 1/00735
701/123
10,166,839 B2 * 1/2019 Yanatsubo .......... B60R 11/0235
(Continued)

FOREIGN PATENT DOCUMENTS

JP 2005016443 A 1/2005
JP 2007314044 A 12/2007
(Continued)

*Primary Examiner* — Hunter B Lonsberry
*Assistant Examiner* — Daniel M. Robert
(74) *Attorney, Agent, or Firm* — Harness, Dickey & Pierce, P.L.C.

(57) ABSTRACT

An evaluation device includes a set temperature evaluation portion, an ecological driving evaluation portion, and a notification portion. The set temperature evaluation portion determines a set temperature evaluation value based on a set temperature that is a target temperature. The ecological driving evaluation portion is configured to determine an ecological driving evaluation value based on at least the set temperature evaluation value. The notification portion is configured to notify the occupant of the ecological driving evaluation value. The level of power saving rises with
(Continued)

change of the set temperature evaluation value or the ecological driving evaluation value. When the set temperature is changed, and the change of the set temperature causes increase of the level of power saving without decrease in power consumption of the vehicular air conditioner, the set temperature evaluation portion changes the set temperature evaluation value in the one of positive and negative directions.

18 Claims, 7 Drawing Sheets

(51) Int. Cl.
*B60H 1/32* (2006.01)
*F24F 11/46* (2018.01)
*B60R 16/037* (2006.01)
*F24F 11/89* (2018.01)

(52) U.S. Cl.
CPC ..... *B60H 1/00764* (2013.01); *B60H 1/00985* (2013.01); *B60H 1/3208* (2013.01); *B60K 23/00* (2013.01); *B60R 16/037* (2013.01); *F24F 11/46* (2018.01); *F24F 11/89* (2018.01); *Y02T 10/88* (2013.01)

(58) Field of Classification Search
CPC ......... B60H 1/3208; F24F 11/46; F24F 11/89; B60K 23/00; B60R 16/037; Y02T 10/88
See application file for complete search history.

(56) References Cited

U.S. PATENT DOCUMENTS

| | | |
|---|---|---|
| 2005/0143876 A1 | 6/2005 | Tanase |
| 2008/0264087 A1 | 10/2008 | Harumoto et al. |
| 2014/0144998 A1* | 5/2014 | Ichishi .............. B60H 1/00314 237/12.3 A |

FOREIGN PATENT DOCUMENTS

| | | | |
|---|---|---|---|
| JP | 2008273332 A | | 11/2008 |
| JP | 2010188777 A | | 9/2010 |
| JP | 2011037385 A | | 2/2011 |
| JP | 2012037200 A | * | 2/2012 |
| JP | 2012166784 A | | 9/2012 |
| JP | 2015182566 A | * | 10/2015 |

* cited by examiner

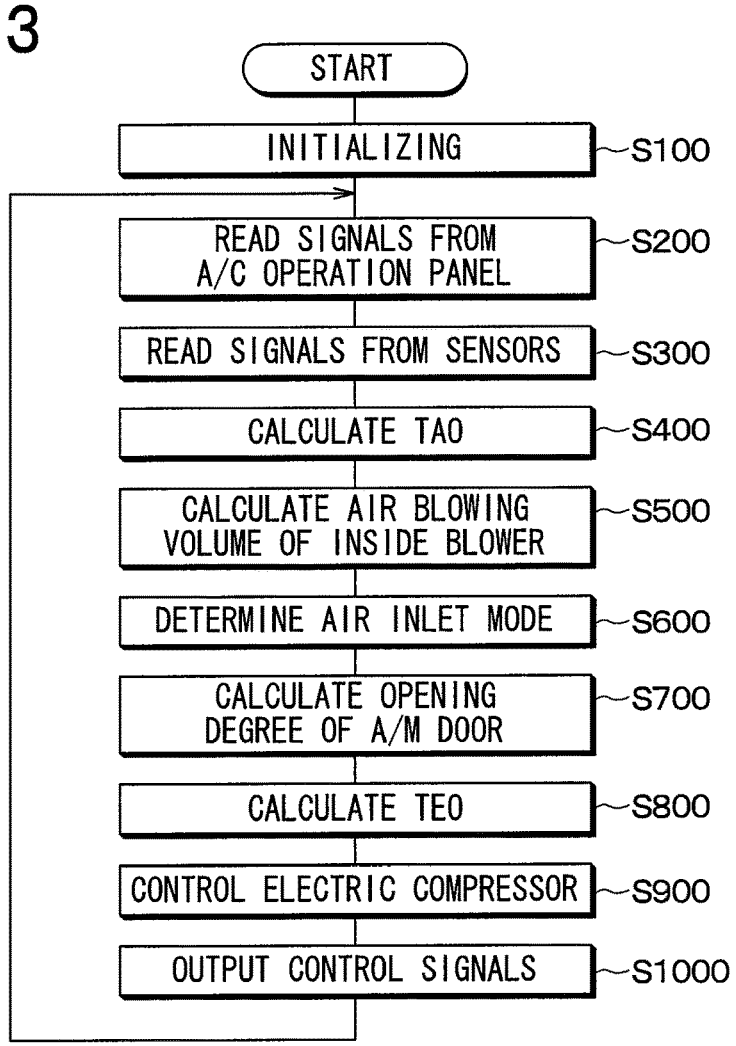
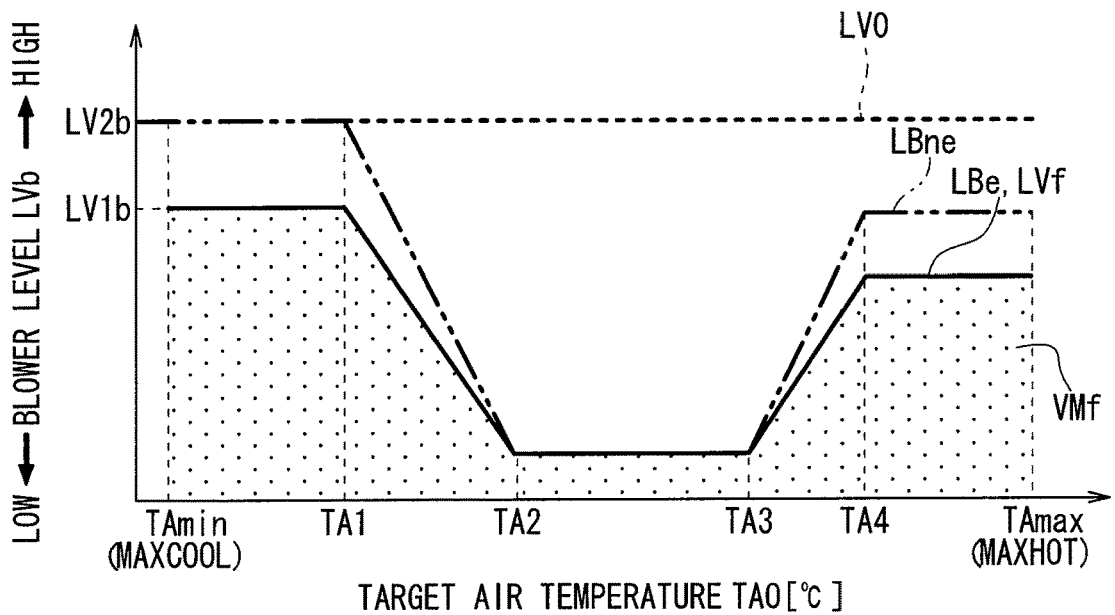

ECOLOGICAL VEHICLE AIR CONDITIONER EVALUATION DEVICE

CROSS REFERENCE TO RELATED APPLICATIONS

This application is a U.S. National Phase Application under 35 U.S.C. 371 of International Application No. PCT/JP2016/076790 filed on Sep. 12, 2016 and published in Japanese as WO 2017/073186 A1 on May 4, 2017. This application is based on and claims the benefit of priority from Japanese Patent Application No. 2015-209701 filed on Oct. 26, 2015. The entire disclosures of all of the above applications are incorporated herein by reference.

TECHNICAL FIELD

The present disclosure relates to an evaluation device that evaluates an operation performed by an occupant of a vehicle to operate a vehicular air conditioner.

BACKGROUND ART

For example, an ecological drive evaluation device described in Patent Literature 1 has been known as an evaluation device of this type. The ecological drive evaluation device described in Patent Literature 1 is a device that evaluates an effort performed by a user (i.e., an occupant as a driver) to achieve ecological drive of a vehicle.

More specifically, the ecological drive evaluation device acquires respective physical quantities associated with a vehicle and measured by in-vehicle devices, such as an engine rotation speed signal. Based on the respective physical quantities, the ecological drive evaluation device detects whether the vehicle is in an idle reduction state or whether the vehicle is in an energy-saving traveling state.

The ecological drive evaluation device having detected these states measures duration of each state. The ecological drive evaluation device having measured the duration evaluates an effort performed by the user to achieve ecological drive, based on a measurement result of the duration. A result of the evaluation is expressed as an ecological drive evaluation index, for example. This ecological drive evaluation index indicates a level of an effort performed by the user to achieve environmentally friendly driving. The index is higher when a sufficient level of effort is performed.

PRIOR ART DOCUMENT

Patent Document

Patent Document 1: JP 2005-16443 A

SUMMARY OF THE INVENTION

In recent years, more and more vehicles are equipped with a traveling system evaluation device that provides guidance for an occupant to increase fuel efficiency of a driving operation performed by the occupant. This type of traveling system evaluation device grades a driving operation performed by an occupant based on an opening degree of an accelerator and the like, and presents the grade to the occupant to urge the occupant to increase fuel efficiency during driving. The ecological drive evaluation device of Patent Literature 1 described above is an example of this type of traveling system evaluation device.

In an actual situation of vehicle use, however, fuel efficiency is considerably affected particularly by air conditioning power consumed by a vehicular air conditioner, among various other factors affecting fuel efficiency. According to findings of the present inventors, none of existing traveling system evaluation devices including the ecological drive evaluation device of Patent Literature 1 considers the effect of air conditioning power at the time of evaluation even in the current situation where fuel efficiency is considerably affected by air conditioning power.

The present disclosure has been developed in consideration of the aforementioned circumstances. An object of the present disclosure is to provide an evaluation device capable of evaluating an operation performed by an occupant to achieve power saving of a vehicular air conditioner.

An evaluation device evaluates an operation of a vehicular air conditioner performed by an occupant, the vehicular air conditioner conditioning air inside a vehicle compartment. The evaluation device includes a set temperature evaluation portion, an ecological driving evaluation portion, and a notification portion. The set temperature evaluation portion is configured to determine a set temperature evaluation value which is an index indicating a level of power saving of the vehicular air conditioner based on a set temperature that is set as a target value of an inside air temperature by the occupant. The ecological driving evaluation portion is configured to determine an ecological driving evaluation value which is the index indicating the level of power saving based on at least the set temperature evaluation value. The notification portion is configured to notify the occupant of the ecological driving evaluation value. The level of power saving rises with change of the set temperature evaluation value or the ecological driving evaluation value in one of positive and a negative value directions. When the set temperature is changed, and the change of the set temperature causes increase of the level of power saving without decrease in power consumption of the vehicular air conditioner, the set temperature evaluation portion changes the set temperature evaluation value in the one of positive and negative directions from a value which is determined before the set temperature is changed.

As described above, at the time of a change of the set temperature, the set temperature evaluation portion shifts the set temperature evaluation value in the one direction from a value determined prior to the change of the set temperature even without decrease in power consumption of the vehicular air conditioner in accordance with the change of the set temperature when the change of the set temperature is a change for raising the level of power saving. Accordingly, an operation performed by the occupant to achieve power saving of the vehicular air conditioner can be evaluated. In addition, an occupant's operation aiming to achieve power saving can be evaluated based on a change of the set temperature evaluation value even when the occupant's operation associated with the set temperature does not immediately decrease power consumption of the vehicular air conditioner. For example, execution of an occupant's operation directed to achieve power saving of the vehicular air conditioner can be urged based on this evaluation.

BRIEF DESCRIPTION OF THE DRAWINGS

FIG. 3 is a flowchart illustrating a control process executed by the air conditioning control unit to perform air conditioning operation of the vehicular air conditioner according to the first embodiment.

FIG. 4 is a chart illustrating a blower level map referred to for determining an air blowing volume based on a target air temperature TAO according to the first embodiment.

EMBODIMENTS FOR EXPLOITATION OF THE INVENTION

Figure 1:
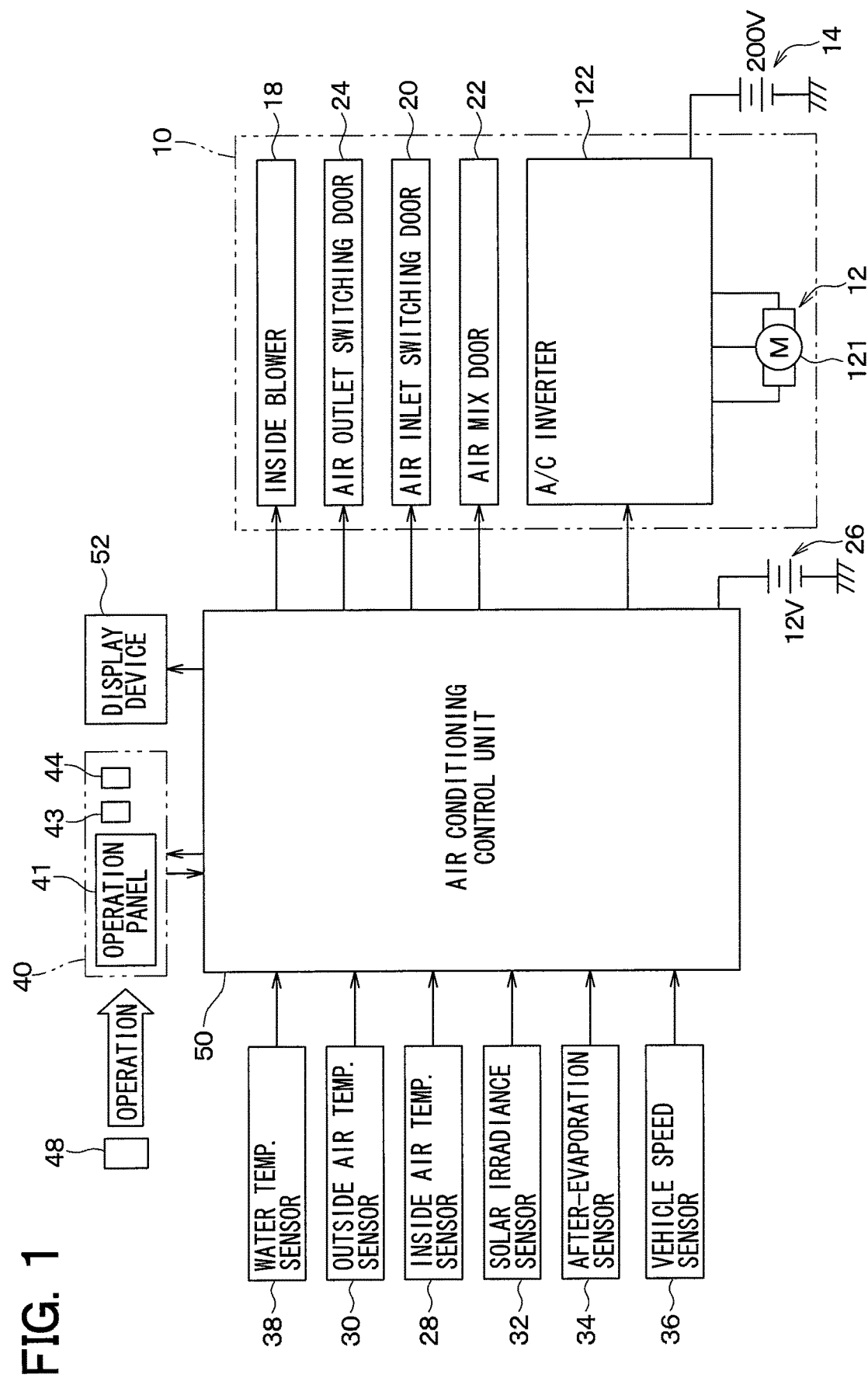
FIG. 1 is a block diagram illustrating an air conditioning control unit included in a vehicular air conditioner, and devices connected to the air conditioning control unit according to a first embodiment of the present disclosure.

Embodiments for carrying out the present disclosure are hereinafter described with reference to the drawings. Identical or equivalent parts in the respective embodiments described herein, including different embodiments described below, are given identical reference numbers in the drawings.

First Embodiment

A vehicular air conditioner 10 according to the present embodiment is mounted on a hybrid vehicle that includes an engine and a motor for traveling both functioning as a driving power source. FIG. 1 is a block diagram illustrating a configuration between an air conditioning control unit 50 included in the vehicular air conditioner 10 and devices connected to the air conditioning control unit 50.

The vehicular air conditioner 10 is a device that conditions air inside a vehicle compartment, and includes a known refrigerating cycle. The refrigerating cycle includes a compressor 12, a condenser, a receiver, an expansion valve, and an evaporator. The compressor 12 sucks and compresses refrigerant, and discharges the compressed refrigerant. The compressor 12 is an electric compressor that includes an electric motor 121 and an inverter 122. The electric motor 121 is driven by power supplied from an in-vehicle battery 14.

The condenser condenses and liquefies high-temperature and high-pressure refrigerant compressed by the compressor 12. The receiver separates refrigerant condensed and liquefied by the condenser into gas and liquid. The expansion valve decompresses and expands liquid refrigerant received from the receiver. The evaporator evaporates and vaporizes low-temperature and low-pressure refrigerant decompressed and expanded by the expansion valve. The refrigerant evaporated and vaporized by the evaporator is sucked into the compressor 12.

The vehicular air conditioner 10 further includes an air conditioning unit provided inside the vehicle to supply conditioned air into the vehicle compartment. The air conditioning unit has a known configuration. More specifically, the air conditioning unit includes an air conditioning case, an inside blower 18, a heater core, an air inlet switching door 20, an air mix door 22, an air outlet switching door 24, and the evaporator. The evaporator is included in both the air conditioning unit and the refrigerating cycle.

The air conditioning case includes an air path therein, and houses the inside blower 18, the heater core, the air inlet switching door 20, the air mix door 22, the air outlet switching door 24, and the evaporator. The inside blower 18 is an electric air blower. The rotation speed of the inside blower 18 is changed in accordance with a control signal generated from the air conditioning control unit 50. Accordingly, an air blowing volume is increased or decreased in accordance with the rotation speed. Air blown from the inside blower 18 is cooled by the evaporator through heat exchange with the refrigerant.

The heater core is a heat exchanger performing heat exchange between engine cooling water and air. The heater core heats a part or the whole of air flowing from the evaporator by utilizing heat of the engine cooling water. The air inlet switching door 20 is an air inlet switching unit that selects inside air (i.e., air inside the vehicle), or outside air (i.e., air outside the vehicle), as air to be sucked into the air conditioning case by the inside blower 18.

The air mix door 22 is a temperature control unit that controls a temperature of blowing air from the air conditioning unit. More specifically, the air mix door 22 controls a flow ratio of an amount of air having passed through the evaporator and flowing into the heater core, to an amount of air having passed through the evaporator and bypassing the heater core, so as to control the temperature of the blowing air from the air conditioning unit by controlling this flow ratio.

In a maximum cooling state of the vehicular air conditioner 10, for example, the whole amount of air having passed through the evaporator bypasses the heater core under control by the air mix door 22. In a maximum heating state of the vehicular air conditioner 10, the whole amount of air having passed through the evaporator flows into the heater core under control by the air mix door 22. The maximum cooling state is a state where a cooling load of the vehicular air conditioner 10 is the maximum. The maximum heating state is a state where a heating load of the vehicular air conditioner 10 is the maximum.

The air outlet switching door 24 is an air outlet switching unit that switches opening and closing of a plurality of air outlets opened toward inside the vehicle. Examples of the plurality of air outlets include a defogger outlet through which air flows toward an inner surface of a window glass inside the vehicle, a face outlet through which air flows toward the upper body of an occupant 48 sitting on a front seat, and a foot outlet through which air flows toward the feet of the occupants 48 sitting on the front seat and a rear seat.

A configuration of a control system of the vehicular air conditioner 10 will be hereinafter described.

The air conditioning control unit 50 is an electronic control unit that controls the vehicular air conditioner 10. The air conditioning control unit 50 receives power supplied from an in-vehicle battery 26 and comes into a start state when an ignition switch corresponding to a vehicle traveling switch is turned on.

The air conditioning control unit 50 includes a microcomputer that includes a central processing unit (CPU), a read-only memory (ROM), a random-access memory (RAM), and others. Analog signals generated from sensors or other parts connected to the air conditioning control unit 50 are converted into digital signals by an input circuit. These digital signals are input to the microcomputer.

For example, the air conditioning control unit 50 receives detection signals from an inside air temperature sensor 28 that detects an inside air temperature TR, an outside air temperature sensor 30 that detects an outside air temperature TAM, and a solar irradiance sensor 32 that detects a solar irradiance amount TS radiated into the vehicle. The air conditioning control unit 50 further receives detection signals from an after-evaporation sensor 34 that detects an air temperature TE of air immediately after passing through the evaporator (hereinafter referred to as the after-evaporation temperature TE), a vehicle speed sensor 36 that detects a vehicle speed SPD, a water temperature sensor 38 that detects an engine cooling water temperature TW, i.e., a water temperature TW of engine cooling water corresponding to a heat source of the heater core, and other parts.

Figure 2A:
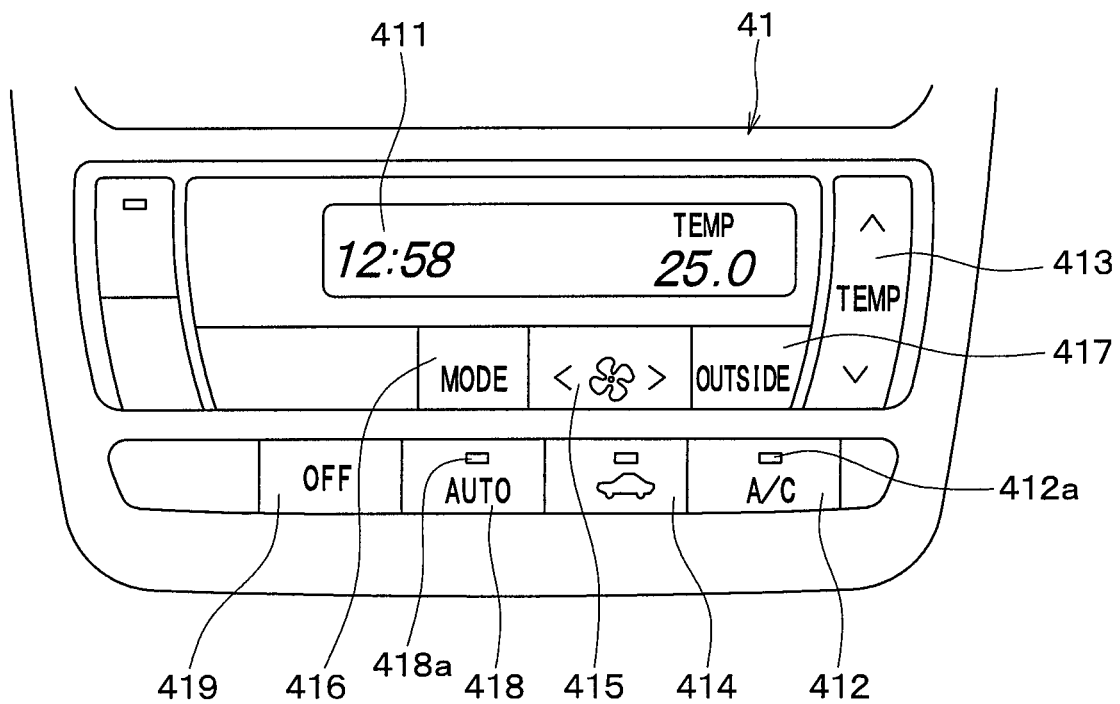
FIG. 2A is a front view of an operation panel included in an air conditioning operation portion illustrated in FIG. 1.

The air conditioning control unit 50 further receives signals from an air conditioning operation portion 40 provided on a part of an instrument panel. As illustrated in FIG. 1, the air conditioning operation portion 40 includes an operation panel 41, an eco-mode switch 43, and a focus air mode switch 44. The operation panel 41, the eco-mode switch 43, and the focus air mode switch 44 are operable by the occupant 48 sitting on the front seat, and have configurations illustrated in FIGS. 2A to 2C, respectively. More specifically, the operation panel 41 is a unit through which an operation for operating the vehicular air conditioner 10, and various types of setting operations are input by the occupant 48 as illustrated in FIG. 2A.

The operation panel 41 includes a display 411 on which various types of items are displayed, and further includes an air conditioning switch 412, a temperature setting switch 413, an inside air circulation switch 414, a blower switch 415, a mode selector switch 416, an outside air temperature display switch 417, an auto switch 418, and an air conditioning stop switch 419.

The air conditioning switch 412 of the operation panel 41 is an operation switch for selecting an operation or a stop of the compressor 12. When the air conditioning switch 412 is changed from an off-state to an on-state, the compressor 12 starts to operate. The vehicular air conditioner 10 thus initiates an air conditioning operation. When the air conditioning switch 412 is changed from the on-state to the off-state, the compressor 12 stops operating. However, when the inside blower 18 continues supplying air, the air flow continues.

The air conditioning switch 412 further includes an air conditioning indicator 412a that displays an operation and a stop of the compressor 12. For example, the air conditioning indicator 412a is turned on during operation of the compressor 12, and is turned off during stop of the compressor 12.

The temperature setting switch 413 is an operation switch for setting a temperature inside the vehicle compartment. More specifically, the occupant 48 (or the user 48) changes a set temperature Tset by operating the temperature setting switch 413. The set temperature Tset is a temperature set by the occupant 48 as a target value of the inside air temperature TR. The set temperature Tset is displayed on the display 411.

The inside air circulation switch 414 is an operation switch for selecting either an inside air circulation mode for sucking inside air, or an outside air introduction mode for sucking outside air, as the air inlet mode of the vehicular air conditioner 10.

The blower switch 415 is an operation switch for setting an air blowing volume of the inside blower 18. The occupant 48 can increase or decrease an air blowing volume by operating the blower switch 415. The air blowing volume is a volume of air blown from the vehicular air conditioner 10 into the vehicle, i.e., an air blowing volume of the inside blower 18.

The mode selector switch 416 is an operation switch for selecting an air outlet for discharging conditioned air from among the plurality of air outlets included in the air conditioning unit of the vehicular air conditioner 10. An air outlet is selected from among the plurality of air outlets by switching between air blowing modes of the vehicular air conditioner 10. Examples of the air blowing modes include a face mode, a foot mode, a defogger mode, a bi-level mode, and a foot-defogger mode.

The face mode is an air blowing mode that opens the face outlet and closes the foot outlet and the defogger outlet. The foot mode is an air blowing mode that opens the foot outlet and closes the face outlet and the defogger outlet. The defogger mode is an air blowing mode that opens the defogger outlet and closes the face outlet and the foot outlet. The bi-level mode is an air blowing mode that opens both the face outlet and the foot outlet and closes the defogger outlet. The foot-defogger mode is an air blowing mode that opens both the foot outlet and the defogger outlet and closes the face outlet.

The outside air temperature display switch 417 is an operation switch for displaying on the display 411 the outside air temperature TAM detected by the outside air temperature sensor 30.

The auto switch 418 is an operation switch for performing automatic operation of the vehicular air conditioner 10, i.e., automatic air conditioning control of the vehicular air conditioner 10. More specifically, when the auto switch 418 is changed from an off-state to an on-state, the air conditioning control unit 50 performs automatic air conditioning control based on a target air temperature TAO as illustrated in FIG. 3.

During this automatic air conditioning control, the air conditioning control unit 50 sequentially sets the target air temperature TAO such that the inside air temperature TR becomes equivalent to the set temperature Tset, based on the set temperature Tset, the inside air temperature TR, the outside air temperature TAM, the solar irradiance amount TS, and other conditions. Subsequently, the air conditioning control unit 50 performs the automatic air conditioning operation of the vehicular air conditioner 10 based on the set target air temperature TAO.

When the automatic air conditioning control is executed by switching from the off-state to the on-state of the auto switch 418, usually the compressor 12 starts to operate, and the air blowing volume, the air inlet mode, and the like are set automatically. However, when any of the air conditioning switch 412, the inside air circulation switch 414, and the blower switch 415 is operated during execution of the automatic air conditioning control, the setting input by the operated switch has priority over the automatic setting under the automatic air conditioning control.

The air conditioning control unit 50 is connected to a driving system control device that controls driving of the engine and the motor for traveling. When the engine cooling water temperature TW is below a water temperature threshold set beforehand, the air conditioning control unit 50 requests the driving system control device to carry out an action for increasing the engine cooling water temperature TW. Accordingly, the engine starts driving and raises the engine cooling water temperature TW, so that the heater core is sufficiently heated for heating operation.

For example, the action for increasing the engine cooling water temperature TW is achieved by either one or both of an action for increasing an idling rotation speed of the engine to a speed higher than that speed before issue of the request, and an action for starting the engine during a stop of the engine. For example, the water temperature threshold is set to a higher value as the set temperature Tset increases.

During the heating operation of the vehicular air conditioner 10, air blown into the vehicle compartment is heated by waste heat from the engine via the heater core. When the set temperature Tset increases during the heating operation, for example, the request for the action of increasing the engine cooling water temperature TW is more frequently issued. Accordingly, an occupant's operation for increasing the set temperature Tset during the heating operation may deteriorate power saving of the vehicular air conditioner 10.

The auto switch 418 further includes an auto switch indicator 418a that indicates the on-state and the off-state of the auto switch 418.

The air conditioning stop switch 419 of the operation panel 41 illustrated in FIG. 2A is an operation switch for stopping the operation of the vehicular air conditioner 10. For example, when the air conditioning stop switch 419 is pressed by the occupant 48, the compressor 12 and the inside blower 18 of the vehicular air conditioner 10 stop.

The vehicular air conditioner 10 is capable of including an eco-mode that is for reducing deterioration of a high fuel efficiency effect. More specifically, the vehicular air conditioner 10 is capable of selecting an eco-mode operation determined beforehand to give priority to a high fuel efficiency effect, or a standard driving mode operation as a non-eco-mode operation determined beforehand to give priority to comfortability inside the vehicle compartment. The eco-mode is a power saving operation mode determined beforehand and achieving more power saving by the vehicular air conditioner 10 than the standard operation mode.

Figure 2B:
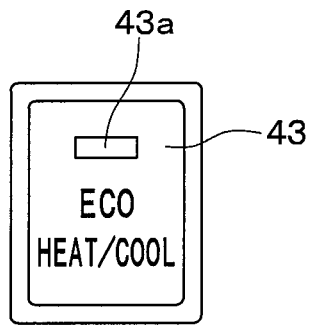
FIG. 2B is a front view of an eco-mode switch included in the air conditioning operation portion illustrated in FIG. 1.

The eco-mode switch 43 illustrated in FIG. 2B is an operation switch for switching between the eco-mode and the non-eco-mode of the vehicular air conditioner 10. The eco-mode switch 43 is provided on the instrument panel at a predetermined position operable by the occupant 48.

The eco-mode switch 43 is pressed and turned on or off for switching between the eco-mode and the non-eco-mode. When the eco-mode switch 43 is turned on, the vehicular air conditioner 10 operates in the eco-mode. When the eco-mode switch 43 is turned off, the vehicular air conditioner 10 operates in the non-eco-mode.

When the eco-mode is selected by turning on the eco-mode switch 43, an eco-mode display unit 43a including a light emitting diode is turned on. When the non-eco-mode is selected by turning off the eco-mode switch 43, the eco-mode display unit 43a is turned off.

Figure 2C:
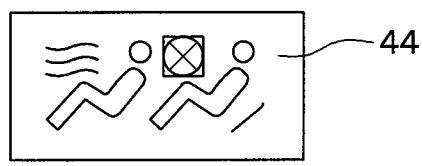
FIG. 2C is a front view of a focus air mode switch included in the air conditioning operation portion illustrated in FIG. 1.

The focus air mode switch 44 illustrated in FIG. 2C is an operation switch for selecting a specific region focus mode, or a non-specific region focus mode, as the air blowing mode. The focus air mode switch 44 is provided on the instrument panel at a predetermined position operable by the occupant 48. The specific region focus mode is an air blowing mode selected to perform air conditioning preferentially of a specific region inside the vehicle determined beforehand. Accordingly, the specific region focus mode brings a focused air blow state where air blown from the vehicular air conditioner 10 is focused on a specific region inside the vehicle compartment. The specific region may either include or exclude a driver's seat. According to the present embodiment, the specific region includes a driver's seat. For example, the specific region focus mode is similar to a one-seat concentration mode disclosed in JP-2012-136212-A.

The focus air mode switch 44 is pressed and turned on or off. When the focus air mode switch 44 is turned on, the vehicular air conditioner 10 operates in the specific region focus mode. In the specific region focus mode, air blown from the air conditioning unit of the vehicular air conditioner is focused on the specific region.

When the focus air mode switch 44 is turned off, the vehicular air conditioner 10 operates in the non-specific region focus mode. In the non-specific region focus mode, the vehicular air conditioner 10 operates in an air blowing mode set by the automatic air conditioning control or in an air blowing mode set by the mode selector switch 416. For example, the on-state or the off-state of the focus air mode switch 44 is displayed on the display 411.

The air conditioning control unit 50 outputs control signals to the inside blower 18, the air inlet switching door 20, the air mix door 22, the air outlet switching door 24, and the inverter 122 of the compressor 12 to control their operations. For example, the rotation speed of the electric motor 121 of the compressor 12 is controlled by the inverter 122. The operation of the inverter 122 is controlled by control signals from the air conditioning control unit 50.

A control process performed by the air conditioning control unit 50 will be hereinafter described with reference to FIGS. 3 to 10. FIG. 3 is a flowchart illustrating a control process executed by the air conditioning control unit 50 to perform air conditioning operation of the vehicular air conditioner 10. For example, when an ignition switch corresponding to a vehicle traveling switch is turned on, the air conditioning control unit 50 starts the control process illustrated in FIG. 3, and repeatedly and cyclically executes the control process illustrated in FIG. 3.

Initially, respective set values are initialized in step S100 as illustrated in FIG. 3. In subsequent step S200, respective signals generated from the air conditioning operation portion 40 including the operation panel 41 and other components are read. In subsequent step S300, signals from the respective sensors 28, 30, 32, 34, 36, and 38 are read.

In subsequent step S400, the air conditioning control unit 50 calculates the target air temperature TAO based on the set temperature Tset, the outside air temperature TAM, the inside air temperature TR, the solar irradiance amount TS, and other conditions. The target air temperature TAO is a target value of a blowing air temperature that is a temperature of air blown from the air conditioning unit of the vehicular air conditioner 10 into the vehicle compartment. The target air temperature TAO is determined by using a control formula determined beforehand such that the inside air temperature TR becomes equivalent to the set temperature Tset.

For example, when the target air temperature TAO is set to a temperature TAmin in FIG. 4, the vehicular air conditioner 10 comes into the maximum cooling state. When the target air temperature TAO is set to a temperature TAmax, the vehicular air conditioner 10 comes into the maximum heating state. The temperature TAmin is a value determined as a sufficiently low temperature for realizing the maximum cooling state of the vehicular air conditioner 10 by using the control formula of the target air temperature TAO. The temperature TAmax is a value determined as a sufficiently high temperature for realizing the maximum heating state of the vehicular air conditioner 10 by using the control formula of the target air temperature TAO.

When the set temperature Tset is set to be the maximum temperature in a variation range of the set temperature Tset by operating the temperature setting switch 413, the target air temperature TAO is set to be the temperature TAmax. When the set temperature Tset is set to be the minimum temperature in the variation range of the set temperature Tset, the target air temperature TAO is set to be the temperature TAmin. Accordingly, the occupant 48 can bring the vehicular air conditioner 10 to the maximum cooling state or the maximum heating state by operating the temperature setting switch 413.

After completion of step S400 in FIG. 3, an air blowing volume is determined based on the target air temperature TAO in step S500. For example, the air blowing volume is determined with reference to a blower level map determined beforehand as illustrated in FIG. 4. This blower level map is a two-dimensional graph where a horizontal axis represents a target air temperature TAO and a vertical axis represents a blower level LVb. The blower level LVb is a parameter corresponding to the air blowing volume. The air blowing volume increases as the blower level LVb rises.

In the blower level map illustrated in FIG. 4, a relationship between the blower level LVb and the target air temperature TAO in the eco-mode is indicated by a solid line LBe, and a relationship between the blower level LVb and the target air temperature in the non-eco-mode is indicated by a two-dot chain line LBne. Accordingly, in each of the eco-mode and the non-eco-mode, the blower level LVb becomes a maximum value LV1b or LV2b when the vehicular air conditioner 10 is in the maximum cooling state, i.e., a MAXCOOL state. This maximum value is maintained in a range where the target air temperature TAO is equal to or lower than TA1. A relationship of "TAmin<TA1<TA2<TA3<TA4<TAmax" holds for the respective values TAmin, TA1, TA2, TA3, TA4, and TAmax on the horizontal axis in FIG. 4.

In a range of the target air temperature TAO from TA1 to TA2, the blower level LVb decreases as the target air temperature TAO increases. In a range of the target air temperature TAO from TA2 to TA3, the blower level LVb is fixed at the minimum value regardless of the target air temperature TAO. In a range of the target air temperature TAO from TA3 to TA4, the blower level LVb increases as the target air temperature TAO increases. In a range including the maximum heating state of the vehicular air conditioner 10 (i.e., a MAXHOT state), in other words, in a range where the target air temperature TAO is equal to or higher than TA4, the blower level LVb is fixed at the value corresponding to TA4 of the target air temperature TAO regardless of the target air temperature TAO.

As obvious from FIG. 4, the blower level LVb in the eco-mode is kept lower than the blower level LVb in the non-eco-mode except when the blower level LVb is the minimum value. When the air blowing volume is manually set by operating the blower switch 415, the blower level LVb is set in accordance with the air blowing volume set manually.

Returning to FIG. 3, after completion of step S500, the air inlet mode is determined based on the target air temperature TAO in step S600. When the air inlet mode is manually set by operating the inside air circulation switch 414, the air inlet mode is set in accordance with the air inlet mode set manually.

In subsequent step S700, an opening degree of the air mix door 22 is calculated based on the target air temperature TAO such that the blowing air temperature of the air conditioning unit becomes equivalent to the target air temperature TAO. The ratio of the amount of air having passed through the evaporator and flowing to the heater core, to the amount of air having passed through the evaporator and bypassing the heater core is determined in accordance with the opening degree of the air mix door 22.

In subsequent step S800, a target after-evaporation temperature TEO corresponding to a target value of the after-evaporation temperature TE is calculated based on the target air temperature TAO such that the blowing air temperature of the air conditioning unit becomes equivalent to the target air temperature TAO.

In subsequent step S900, a rotation speed of the compressor 12 is determined such that the after-evaporation temperature TE becomes equivalent to the target after-evaporation temperature TEO. In this case, the allowable maximum rotation speed of the rotation speed of the compressor 12 that is the maximum rotation speed of the compressor 12 is set lower in the eco-mode than in the non-eco-mode. When a stop of the compressor 12 is manually set by operating the air conditioning switch 412, the rotation speed of the compressor 12 is set to be zero.

In subsequent step S1000, control signals are output to respective actuators and the like to obtain respective control states calculated or determined in respective steps S400 to S900. However, when the operation of the vehicular air conditioner 10 is stopped by operating the air conditioning stop switch 419, all of the respective actuators including the compressor 12 and the inside blower 18 are stopped.

After the control signals are output in step S1000, the process returns to step S200 to continue execution of the respective steps from step S200.

Figure 5:
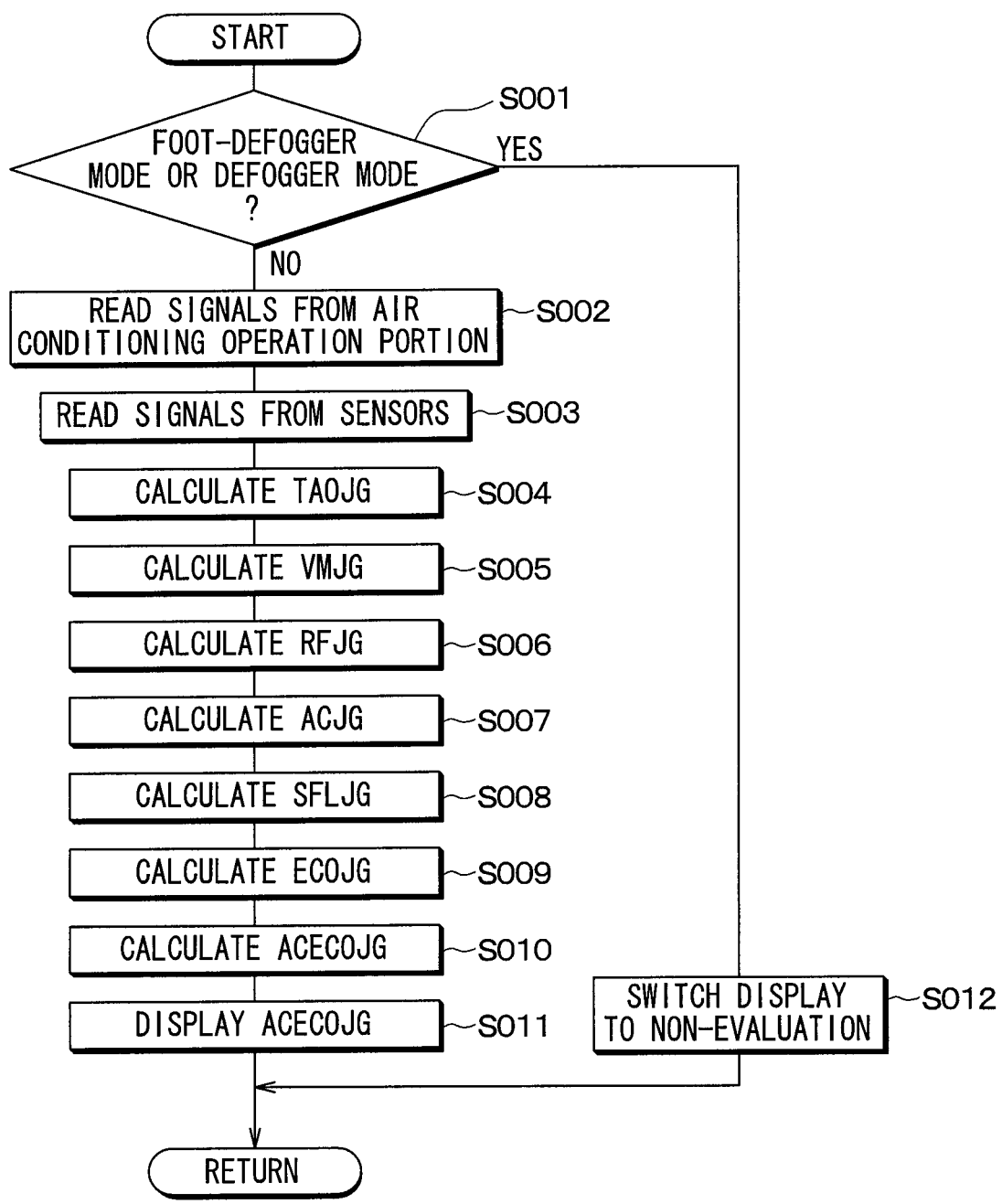
FIG. 5 is a flowchart illustrating a control process executed by the air conditioning control unit to evaluate an operation performed by an occupant to operate the vehicular air conditioner according to the first embodiment.

As described above, the air conditioning control unit 50 is an electronic control unit that performs air conditioning control. The air conditioning control unit 50 also has a function of an evaluation device that evaluates an operation performed by the occupant 48 to operate the vehicular air conditioner 10. For example, the air conditioning control unit 50 functioning as the evaluation device starts the control process illustrated in FIG. 5 when the ignition switch corresponding to the vehicle traveling switch is turned on, and cyclically and repeatedly executes the control process illustrated in FIG. 5. The control process illustrated in FIG. 5 is executed in parallel with the control process illustrated in FIG. 3. FIG. 5 is a flowchart illustrating a control process executed to evaluate an operation performed by the occupant 48 to operate the vehicular air conditioner 10.

Initially, the air blowing mode of the vehicular air conditioner 10 is recognized in step S001 as illustrated in FIG.

5. Thereafter, the air conditioning control unit 50 determines whether the air blowing mode is the defogger mode or the foot-defogger mode.

When it is determined that the air blowing mode is the defogger mode or the foot-defogger mode in step S001, the process proceeds to step S012. When it is determined that the air blowing mode is neither the defogger mode nor the foot-defogger mode, the process proceeds to step S002.

In step S002, respective signals from the air conditioning operation portion 40 are read. In subsequent step S003, signals from the respective sensors 28, 30, 32, 34, 36, and 38 are read. After completion of step S003, the process proceeds to step S004.

Figure 6:
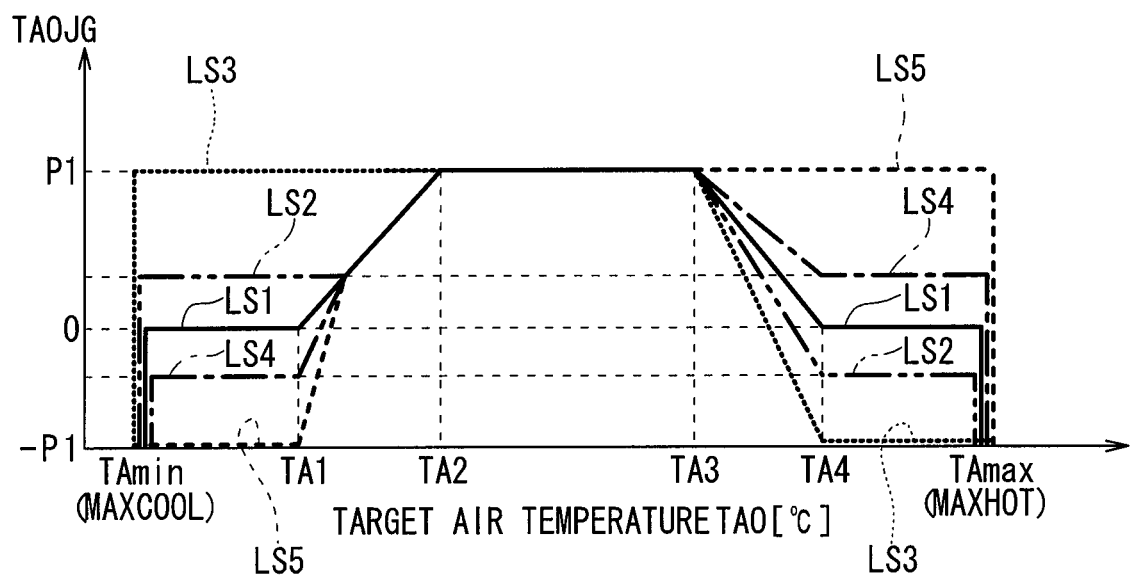
FIG. 6 is a chart illustrating a set temperature evaluation map referred to for determining a set temperature evaluation value TAOJG in the control process illustrated in FIG. 5.

In step S004, the air conditioning control unit 50 determines a set temperature evaluation value TAOJG with reference to a set temperature evaluation map illustrated in FIG. 6 based on the target air temperature TAO and the set temperature Tset. The set temperature evaluation value TAOJG is an index value that indicates a level of power saving of the vehicular air conditioner 10 in correspondence with the set temperature Tset. The set temperature evaluation value TAOJG is an index value to urge the occupant's operation for setting the set temperature Tset to increase the set temperature evaluation value TAOJG. The level of power saving of the vehicular air conditioner 10 is also referred to as a level of energy saving, and indicates a level of reduction of energy consumed by the vehicular air conditioner 10. Accordingly, the level of power saving rises as the overall power consumption of the vehicular air conditioner 10 decreases.

The set temperature evaluation map illustrated in FIG. 6 is a two-dimensional graph where a horizontal axis represents a target air temperature TAO and a vertical axis represents a set temperature evaluation value TAOJG. The respective values TAmin, TA1, TA2, TA3, TA4, and TAmax on the horizontal axis in FIG. 6 are similar to the respective values TAmin, TA1, TA2, TA3, TA4, and TAmax on the horizontal axis in FIG. 4.

The set temperature evaluation value TAOJG is determined within a variation range of the set temperature evaluation value TAOJG determined beforehand. An upper limit of the variation range is P1 as a positive value, while a lower limit is −P1. The upper limit P1 or the lower limit −P1 may be a limit value.

More specifically, the variation range of the set temperature evaluation value TAOJG includes not only a positive range extending from zero to one side as a positive side, but also a negative range extending to the other side as a negative side. In other words, the set temperature evaluation value TAOJG may be a positive value, a negative value, or zero. More specifically, absolute values of the upper limit and the lower limit of the variation range of the set temperature evaluation value TAOJG are the same. Accordingly, the variation range of the set temperature evaluation value TAOJG is defined by the positive side and the negative side divided from each other at the center of zero.

According to the set temperature evaluation map illustrated in FIG. 6, a relationship line indicating a relationship between the target air temperature TAO and the set temperature evaluation value TAOJG is varied in accordance with the set temperature Tset to determine the set temperature evaluation value TAOJG based on the set temperature Tset. More specifically, when the set temperature Tset is lower than a first high-temperature side temperature calculated by adding a predetermined step temperature difference to a predetermined reference set temperature, and is higher than a first low-temperature side temperature calculated by subtracting the step temperature difference from the reference set temperature, the relationship between the target air temperature TAO and the set temperature evaluation value TAOJG is indicated by a solid line LS1.

The reference set temperature and the step temperature difference are temperatures experimentally set beforehand. The reference set temperature is determined so as to fall within a temperature range easily to be set by the occupant 48, such as a center value of the variation range of the set temperature Tset. While the reference set temperature is a fixed value according to the present embodiment, the reference set temperature may vary in accordance with a predetermined physical quantity, in such a manner that the reference set temperature increases as the outside air temperature TAM increases, for example.

When the set temperature Tset is equal to or higher than the first high-temperature side temperature, and is lower than a second high-temperature side temperature calculated by adding a value twice larger than the step temperature difference to the reference set temperature, the relationship between the target air temperature TAO and the set temperature evaluation value TAOJG is indicated by a two-dot chain line LS2. When the set temperature Tset is equal to or higher than the second high-temperature side temperature, the relationship between the target air temperature TAO and the set temperature evaluation value TAOJG is indicated by a broken line LS3.

When the set temperature Tset is equal to or lower than the first low-temperature side temperature and is higher than a second low-temperature side temperature calculate by subtracting a value twice larger than the step temperature difference from the reference set temperature, the relationship between the target air temperature TAO and the set temperature evaluation value TAOJG is indicated by a chain line LS4. When the set temperature Tset is equal to or lower than the second low-temperature side temperature, the relationship between the target air temperature TAO and the set temperature evaluation value TAOJG is indicated by a broken line LS5.

As apparent from the respective relationship lines LS1 to LS5 in the set temperature evaluation map illustrated in FIG. 6, the set temperature evaluation value TAOJG increases as the set temperature Tset set during cooling operation increases. Conversely, the set temperature evaluation value TAOJG increases as the set temperature Tset set during heating operation decreases. For example, when the set temperature Tset is set such that the target air temperature TAO falls within the temperature range from TA2 to TA3 corresponding to a central range in the variation range of the target air temperature TAO, the set temperature evaluation value TAOJG becomes equivalent to P1 corresponding to the upper limit of the set temperature evaluation value TAOJG.

Accordingly, the level of power saving of the vehicular air conditioner 10 rises as the set temperature evaluation value TAOJG shifts toward the positive side in the positive value and negative value direction.

When the vehicular air conditioner 10 is in the maximum cooling state or the maximum heating state, for example, the maximum cooling state or the maximum heating state is maintained even with a slight change of the set temperature Tset. In this case, power consumption of the vehicular air conditioner 10 is not affected by the set temperature Tset. According to the present embodiment, however, at the time of a change of the set temperature Tset to be a higher temperature in the maximum cooling state (i.e., MAXCOOL state) of the vehicular air conditioner 10, the set temperature evaluation value TAOJG shifts toward the positive side from a value determined prior to the change of the set temperature Tset, even in the state where the maximum cooling state is maintained without decrease in power consumption of the vehicular air conditioner 10 in accordance with the change of the set temperature Tset as illustrated in FIG. 6. This shift of the set temperature evaluation value TAOJG is produced as a result of a change of the relationship line for determining the set temperature evaluation value TAOJG from the solid line LS1, which is exhibited before the change of the set temperature Tset, for example, to the two-dot chain line LS2 or the broken line LS3 in accordance with the change of the set temperature Tset to a higher temperature.

The same is applicable to the maximum heating condition (i.e., a MAXHOT state) of the vehicular air conditioner 10. More specifically, at the time of a change of the set temperature Tset to a lower temperature in the maximum heating state of the vehicular air conditioner 10, the set temperature evaluation value TAOJG shifts toward the positive side from a value prior to the change of the set temperature Tset, even in the state where the maximum heating state is maintained without decrease in power consumption of the vehicular air conditioner 10 in accordance with the change of the set temperature Tset as illustrated in FIG. 6. This shift of the set temperature evaluation value TAOJG is produced as a result of a change of the relationship line for determining the set temperature evaluation value TAOJG from the solid line LS1, which is exhibited before the change of the set temperature Tset, for example, to the chain line LS4 or the broken line LS5 in accordance with the change of the set temperature Tset to a lower temperature.

The changes of the set temperature evaluation value TAOJG in the maximum cooling state and the maximum heating state can be summarized into the following conclusion. At the time of a change of the set temperature Tset, the set temperature evaluation value TAOJG shifts to the positive side from a value determined prior to the change of the set temperature Tset even without decrease in power consumption of the vehicular air conditioner 10 in accordance with the change of the set temperature Tset when the change of the set temperature Tset is a change for raising the level of power saving.

Accordingly, the occupant's operation for setting the set temperature Tset is urged by the shift of the set temperature evaluation value TAOJG to bring the vehicular air conditioner 10 out of the maximum cooling state or the maximum heating state when the vehicular air conditioner 10 is in the maximum cooling state or the maximum heating state. After completion of step S004, the process proceeds to step S005.

In step S005, the air conditioning control unit 50 determines an air blowing volume evaluation value VMJG based on the air blowing volume. The air blowing volume evaluation value VMJG is an index value indicating a level of power saving of the vehicular air conditioner 10 in correspondence with the air blowing volume. In this case, the level of power saving of the vehicular air conditioner 10 rises as the air blowing volume evaluation value VMJG shifts toward the positive side. The air blowing volume evaluation value VMJG is an index value to urge the occupant's operation for setting the air blowing volume to increase the air blowing volume evaluation value VMJG.

More specifically, the air blowing volume evaluation value VMJG is determined within a variation range of the air blowing volume evaluation value VMJG determined beforehand. This variation range is a positive side range including zero. More specifically, the upper limit of the variation range of the air blowing volume evaluation value VMJG is P1 as a positive value, while the lower limit is zero. The upper limit P1 of the variation range of the air blowing volume evaluation value VMJG is equivalent to the upper limit of the variation range of the set temperature evaluation value TAOJG.

The air blowing volume is associated with the blower level LVb. Accordingly, for example, a zero evaluation blower level LV0 corresponding to the air blowing volume evaluation value VMJG set to be zero, and an upper limit evaluation blower level LVf corresponding to the air blowing volume evaluation VMJG set to be the upper limit of the variation range are determined beforehand as predetermined values for the blower level LVb. Each of the zero evaluation blower level LV0 and the upper limit evaluation blower level LVf may be either variable or fixed as long as a relationship "LV0>LVf" is maintained.

When the blower level LVb commanded to the inside blower 18 is equal to or higher than the zero evaluation blower level LV0, the air blowing volume evaluation value VMJG is set to be zero. When the blower level LVb is equal to or lower than the upper limit evaluation blower level LVf, the air blowing volume evaluation value VMJG is set to be P1 corresponding to the upper limit of the variation range of the air blowing volume evaluation value VMJG. When the blower level LVb is higher than the upper limit evaluation blower level LVf and lower than the zero evaluation blower level LV0, the air blowing volume evaluation value VMJG is calculated in proportion to the blower level LVb within the variation range of the air blowing volume evaluation value VMJG (i.e., within the range from 0 to P1). Accordingly, in the foregoing case, the air blowing volume evaluation value VMJG is calculated by following formula F1.

$$VMJG = P1/(LV0-LVf) \times (LV0-LVb) \quad \text{Formula F1}$$

According to the present embodiment presented by way of example, the zero evaluation blower level LV0 is a fixed value that is a blower level LV2b corresponding to the blower level LVb during the MAXCOOL in the non-eco-mode as illustrated in FIG. 4. The upper limit evaluation blower level LVf is a blower level LVb automatically determined from the solid line LBe based on the target air temperature TAO in the eco-mode.

On the assumption that the zero evaluation blower level LV0 and the upper limit evaluation blower level LVf are determined in this manner, the air blowing volume evaluation value VMJG becomes equivalent to P1 corresponding to the upper limit of the air blowing volume evaluation value VMJG when a relationship point indicating a relationship between the blower level LVb and the target air temperature TAO falls within a range VMf in the blower level map illustrated in FIG. 4. The range VMf is a range where the blower level LVb becomes equal to or lower than the upper limit evaluation blower level LVf. When the relationship point between the blower level LVb and the target air temperature TAO falls within a range between the solid line LBe and the maximum value LV2b of the blower level LVb in FIG. 4, the air blowing volume evaluation value VMJG is calculated by formula F1. After completion of step S005, the process proceeds to step S006.

In step S006, the air conditioning control unit 50 determines an inside-outside air evaluation value RFJG based on the air inlet mode of the vehicular air conditioner 10 and the outside air temperature TAM. The inside-outside air evaluation value RFJG is an index value indicating a level of power saving of the vehicular air conditioner 10 in correspondence with selection of inside air or outside air introduced into the vehicular air conditioner 10. In this case, the level of power saving of the vehicular air conditioner 10 rises as the inside-outside air evaluation value RFJG shifts toward the positive side. The inside-outside air evaluation value RFJG is an index value to urge the occupant's operation for selecting the air inlet mode to increase the inside-outside air evaluation value RFJG.

More specifically, the inside-outside evaluation value RFJG is determined within a variation range of the inside-outside air evaluation value RFJG determined beforehand. This variation range is a positive side range including zero. More specifically, the upper limit of the variation range of the inside-outside air evaluation value RFJG is P1 as a positive value, while the lower limit is zero. The upper limit P1 of the variation range of the inside-outside air evaluation value RFJG is equivalent to the upper limit of the variation range of the set temperature evaluation value TAOJG.

Figure 7:
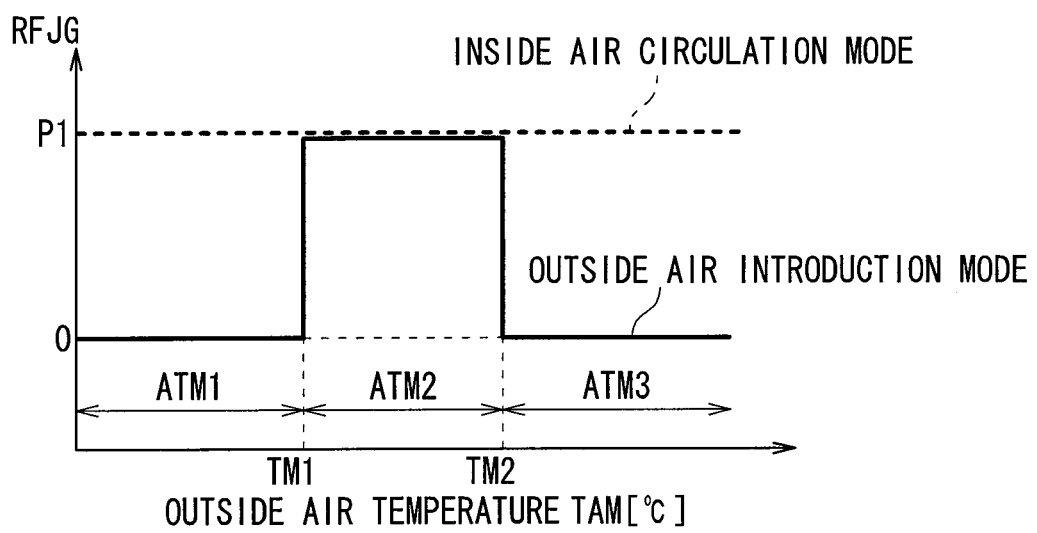
FIG. 7 is a chart illustrating an inside-outside air evaluation map referred to for determining an inside-outside air evaluation value RFJG in the control process illustrated in FIG. 5.

For example, the inside-outside air evaluation value RFJG is determined with reference to an inside-outside air evaluation map illustrated in FIG. 7. Concerning the effect of the air inlet mode on the level of power saving of the vehicular air conditioner 10, the outside air introduction mode basically gives more adverse effect than the inside air circulation mode. However, in view of preventing deterioration of power saving, either the outside air introduction mode or the inside air circulation mode may be selected depending on an ambient environment indicated by the outside air temperature TAM or the like.

Accordingly, the inside-outside air evaluation map in FIG. 7 contains a first temperature range ATM1, a second temperature range ATM2, and a third temperature range ATM3 defined beforehand as continuous temperature ranges connected in series. The first temperature range ATM1 is a temperature range where the outside air temperature TAM is equal to or lower than a first outside air temperature threshold TM1. The third temperature range ATM3 is a temperature range where the outside air temperature TAM is equal to or higher than a second outside air temperature threshold TM2 that is higher than the first outside air temperature threshold TM1. The second temperature range ATM2 is a temperature range disposed between the first temperature range ATM1 and the third temperature range ATM3. Each of the first outside air temperature threshold TM1 and the second outside air temperature threshold TM2 is experimentally set beforehand such that each of the first temperature range ATM1 and the third temperature range ATM3 falls within a range where the level of power saving is considered to be obviously higher in the inside air circulation mode than in the outside air introduction mode.

When the outside air temperature TAM falls within the first temperature range ATM1 or the third temperature range ATM3 in the inside-outside air evaluation map illustrated in FIG. 7, the inside-outside air evaluation value RFJG is set to be zero in the state where the outside air introduction mode is selected as the air inlet mode. However, when the inside air circulation mode is selected as the air inlet mode, the inside-outside air evaluation value RFJG is set equal to P1 corresponding to the upper limit of the variation range of the inside-outside air evaluation value RFJG.

When the outside air temperature TAM falls within the second temperature range ATM2, the inside-outside air evaluation value RFJG is set equal to P1 corresponding to the upper limit regardless of the air inlet mode. After completion of step S006, the process proceeds to step S007.

In step S007, the air conditioning control unit 50 determines a compressor power evaluation value ACJG based on power consumption Wcm of the compressor 12. The compressor power evaluation value ACJG is an index value indicating a level of power saving of the vehicular air conditioner 10 in correspondence with the power consumption Wcm of the compressor 12. In this case, the level of power saving of the vehicular air conditioner 10 rises as the compressor power evaluation value ACJG shifts further toward the positive side.

Figure 8:
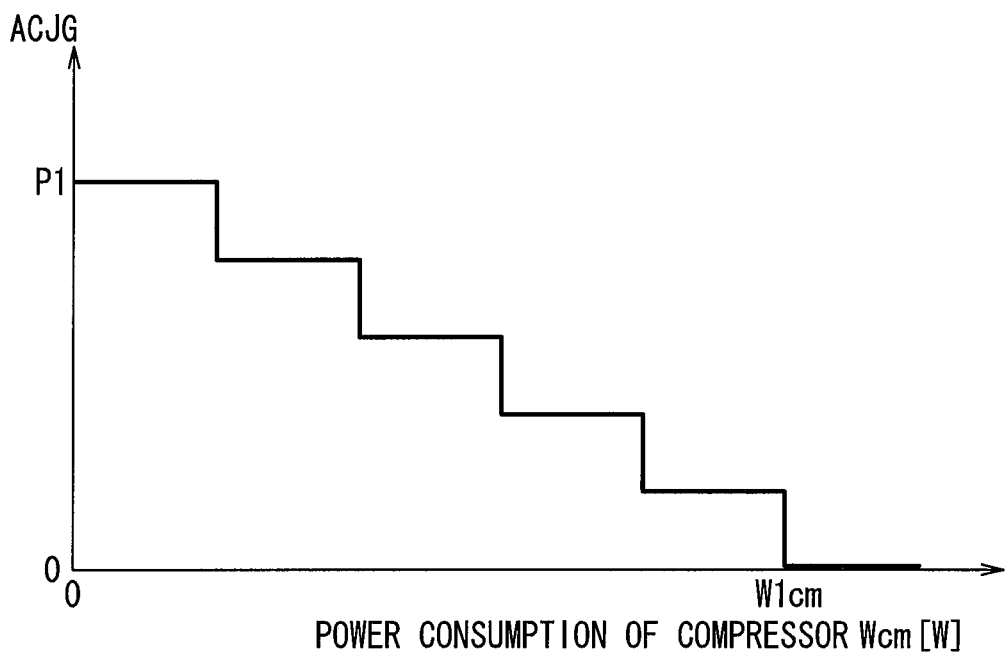
FIG. 8 is a chart illustrating a power evaluation map referred to for determining a compressor power evaluation value ACJG in the control process illustrated in FIG. 5.

More specifically, as illustrated in a power evaluation map in FIG. 8, the compressor power evaluation value ACJG is determined within a variation range of the compressor power evaluation value ACJG determined beforehand. This variation range is a positive side range including zero. More specifically, the upper limit of the variation range of the compressor power evaluation value ACJG is P1 as a positive value, while the lower limit is zero. The upper limit P1 of the variation range of the compressor power evaluation value ACJG is equivalent to the upper limit of the variation range of the set temperature evaluation value TAOJG.

For example, the compressor power evaluation value ACJG is determined with reference to the power evaluation map illustrated in FIG. 8. The level of power saving of the vehicular air conditioner 10 deteriorates (or lowers) as the power consumption Wcm of the compressor 12 increases. Accordingly, in the power evaluation map illustrated in FIG. 8, the compressor power evaluation value ACJG decreases as the power consumption Wcm of the compressor 12 increases. When the power consumption Wcm of the compressor 12 is equal to or higher than a power consumption threshold W1*cm* determined beforehand, the compressor power evaluation value ACJG is set to be zero. When the compressor 12 is stopped by an occupant's operation for turning off the air conditioning switch 412 or by other methods, the compressor power evaluation value ACJG is set equal to P1 corresponding to the upper limit of the variation range of the compressor power evaluation value ACJG.

For example, the power consumption Wcm of the compressor 12 represented on the horizontal axis of the power evaluation map is calculated as a value equivalent to power consumption of the electric motor 121 included in the compressor 12. Thereafter, the compressor power evaluation value ACJG is determined based on the power consumption Wcm of the compressor 12.

While the compressor power evaluation value ACJG in the power evaluation map illustrated in FIG. 8 changes stepwise in accordance with the power consumption Wcm of the compressor 12, the compressor power evaluation value ACJG may continuously change in accordance with the power consumption Wcm.

The occupant 48 can stop the compressor 12 by performing the occupant's operation for turning off the air conditioning switch 412. However, the power consumption Wcm of the compressor 12 is not increased or decreased directly by an operation performed by the occupant 48 during air conditioning operation. Accordingly, the compressor power evaluation value ACJG is not generally increased or decreased directly by an operation performed by the occupant 48. After completion of step S007, the process proceeds to step S008.

In step S008, the air conditioning control unit 50 determines an air blowing mode evaluation value SFLJG based on whether the air blowing mode of the vehicular air conditioner 10 is the specific region focus mode. When it is determined that the air blowing mode is the specific region focus mode, an air conditioning load imposed on regions other than the specific region inside the vehicle is smaller than that load in a non-specific region focus mode. Accordingly, the level of power saving of the vehicular air conditioner 10 rises.

The air blowing mode evaluation value SFLJG is an index value indicating a level of power saving of the vehicular air conditioner 10 in correspondence with whether the air blowing mode is the specific region focus mode. In this case, the level of power saving of the vehicular air conditioner 10 rises as the air blowing mode evaluation value SFLJG shifts further toward the positive side. The air blowing mode evaluation value SFLJG is an index value to urge an occupant's operation for operating the focus air mode switch 44 to increase the air blowing mode evaluation value SFLJG, i.e., an index value to urge a switch operation performed by the occupant 48 to select the specific region focus mode as the air blowing mode.

Figure 9:
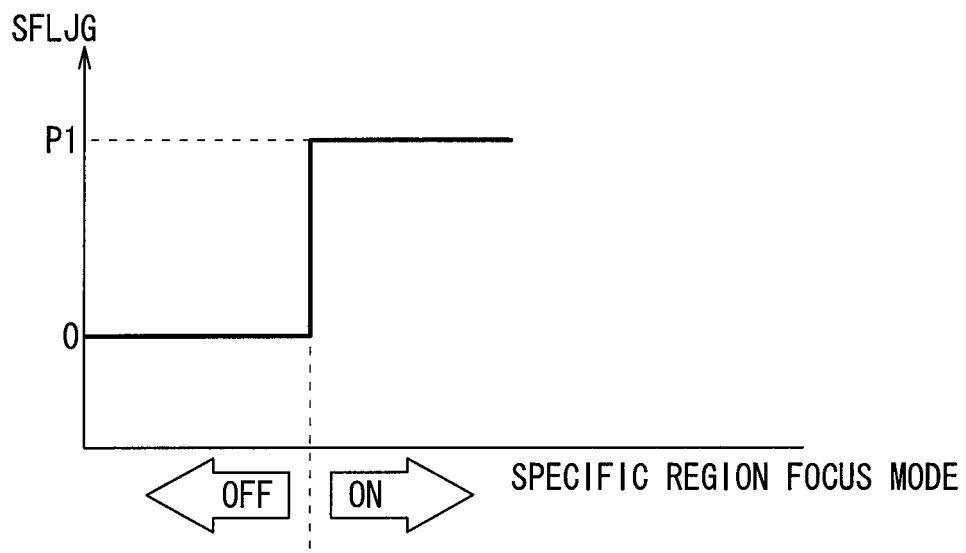
FIG. 9 is a chart illustrating an air blowing mode evaluation map referred to for determining an air blowing mode evaluation value SFLJG in the control process illustrated in FIG. 5.

More specifically, as illustrated in an air blowing mode evaluation map in FIG. 9, the air blowing mode evaluation value SFLJG is determined within a variation range of the air blowing mode evaluation value SFLJG determined beforehand. This variation range is a positive side range including zero. More specifically, the upper limit of the variation range of the air blowing mode evaluation value SFLJG is P1 as a positive value, while the lower limit is zero. The upper limit P1 of the air blowing mode evaluation value SFLJG is equivalent to the upper limit of the variation range of the set temperature evaluation value TAOJG.

Further specifically, the air blowing mode evaluation value SFLJG is set to be not an intermediate value between zero and P1 as the upper limit value, but the value of either zero or P1 based on the air blowing mode evaluation map illustrated in FIG. 9. Accordingly, when the air blowing mode is the specific region focus mode, the air blowing mode evaluation value SFLJG is set to be P1 as the upper limit in the variation range of the air blowing mode evaluation value SFLJG. When the air blowing mode is the non-specific region focus mode, the air blowing mode evaluation value SFLJG is set to be zero. After completion of step S008, the process proceeds to step S009.

In step S009, the air conditioning control unit 50 determines a power saving mode evaluation value ECOJG based on whether the eco-mode corresponding to a power saving driving mode has been selected. The level of power saving of the vehicular air conditioner 10 is higher in the eco-mode than in the non-eco-mode, so that the power saving mode evaluation value ECOJG is determined in step S009.

The power saving mode evaluation value ECOJG is an index value indicating a level of power saving of the vehicular air conditioner 10 in correspondence with whether or not the eco-mode has been selected. In this case, the level of power saving of the vehicular air conditioner 10 rises as the power saving mode evaluation value ECOJG shifts further toward the positive side. The power saving mode evaluation value ECOJG is an index value to urge an occupant's operation for operating the eco-mode switch 43 to increase the power saving mode evaluation value ECOJG, i.e., an index value to urge a switch operation performed by the occupant 48 to be selected the eco-mode by the occupant 48.

Figure 10:
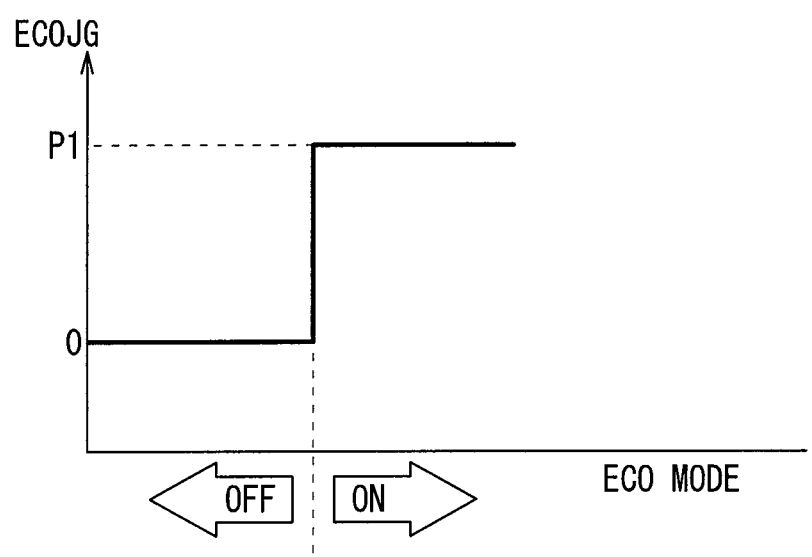
FIG. 10 is a chart illustrating an eco-mode evaluation map referred to for determining a power saving mode evaluation value ECOJG in the control process illustrated in FIG. 5.

More specifically, as illustrated in an eco-mode evaluation map in FIG. 10, the power saving mode evaluation value ECOJG is determined within a variation range of the power saving mode evaluation value ECOJG determined beforehand. This variation range is a positive side range including zero. More specifically, the upper limit of the variation range of the power saving mode evaluation value ECOJG is P1 as a positive value, while the lower limit is zero. The upper limit P1 of the power saving mode evaluation value ECOJG is equivalent to the upper limit of the variation range of the set temperature evaluation value TAOJG.

Further specifically, the power saving mode evaluation value ECOJG is set to be not an intermediate value between zero and P1 as the upper value, but the value of either zero or P1 based on the eco-mode evaluation map illustrated in FIG. 10. Accordingly, when the eco-mode is selected, the power saving mode evaluation value ECOJG is set to be P1 as the upper limit in the variation range of the power saving mode evaluation value ECOJG. When the non-eco-mode is selected, the power saving mode evaluation value ECOJG is set to be zero. After completion of step S009, the process proceeds to step S010.

In step S010, the air conditioning control unit 50 determines an ecological driving evaluation value ACECOJG by using following formula F2 based on an individual evaluation value group constituted by the plurality of individual evaluation values TAOJG, VMJG, RFJG, ACJG, SFLJG, and ECOJG (hereinafter abbreviated as individual evaluation values TAOJG to ECOJG). More specifically, the plurality of individual evaluation values TAOJG to ECOJG are the set temperature evaluation value TAOJG, the air blowing volume evaluation value VMJG, the inside-outside air evaluation value RFJG, the compressor power evaluation value ACJG, the air blowing mode evaluation value SFLJG, and the power saving mode evaluation value ECOJG calculated in steps S004 to S009, respectively. The ecological driving evaluation value ACECOJG is an index value that indicates an integrated level of power saving of the vehicular air conditioner 10.

$$ACECOJG = \alpha \times TAOJG + \beta \times VMJG + \gamma \times RFJG + \delta \times ACJG + \varepsilon \times SFLJG + \zeta \times ECOJG + JGh \quad \text{Formula F2}$$

In formula F2, JGh is a correction value experimentally determined beforehand.

As expressed in formula F2, the plurality of individual evaluation values TAOJG to ECOJG are weighted by coefficients $\alpha$, $\beta$, $\gamma$, $\delta$, $\varepsilon$, and $\zeta$ (hereinafter abbreviated as coefficients $\alpha$ to $\zeta$), respectively. Each of the coefficients $\alpha$ to $\zeta$ is a positive value. As expressed by formula F2, the ecological driving evaluation value ACECOJG is calculated by summing up the plurality of weighted individual evaluation values TAOJG to ECOJG. Accordingly, the level of power saving of the vehicular air conditioner 10 rises as the ecological driving evaluation value ACECOJG shifts further toward the positive side, similarly to the plurality of individual evaluation values TAOJG to ECOJG.

For example, among all of the coefficients $\alpha$ to $\zeta$ in the weighting expressed by formula F2, the coefficient $\alpha$ is set to be a largest value, while the coefficient $\gamma$ is set to be a smallest value. The coefficients $\beta$, $\delta$, $\varepsilon$, and $\zeta$ are intermediate values between the coefficients $\alpha$ and $\gamma$. The coefficients $\beta$, $\delta$, $\varepsilon$, and $\zeta$ are set to be the same value.

The upper value (i.e., maximum value) in each of the variation ranges of the plurality of individual evaluation values TAOJG to ECOJG is set to be the same value P1. In other words, the maximum values of the individual evaluation values TAOJG to ECOJG corresponding to the positive side limits of the variation ranges of the individual evaluation values TAOJG to ECOJG are equalized with each other.

Accordingly, in determining the ecological driving evaluation value ACECOJG, the largest weight is given to the setting temperature evaluation value TAOJG in the plurality of individual evaluation values TAOJG to ECOJG, i.e., in the individual evaluation value group. On the other hand, the smallest weight is given to the inside-outside air evaluation value RFJG in the individual evaluation value group. After completion of step S010, the process proceeds to step S011.

In step S011, the air conditioning control unit 50 displays the ecological driving evaluation value ACECOJG determined in step S010 on the display device 52 in FIG. 1 provided on a part of the instrument panel. In a state where the ecological driving evaluation value ACECOJG has been already displayed on the display device 52, this display is updated. Display of the ecological driving evaluation value ACECOJG may be either display of a numerical value expressing the ecological driving evaluation value ACECOJG, or display of a figure expressing the ecological driving evaluation value ACECOJG, such as a bar graph.

In step S012 in FIG. 5, display of the ecological driving evaluation value ACECOJG on the display device 52 in FIG. 1 is switched to non-evaluation display indicating that the ecological driving evaluation value ACECOJG has not been calculated. In a state where non-evaluation display has been already displayed on the display device 52, this display continues.

The non-evaluation display performed in step S012 is display determined beforehand. For example, in the non-evaluation display, the ecological driving evaluation value ACECOJG is displayed as a fixed value determined beforehand. In addition, the ecological driving evaluation value ACECOJG determined as a fixed value is displayed in a non-evaluation display color determined beforehand to make a display screen inconspicuous and dark.

After completion of step S011 or step S012 in FIG. 5, the process returns to step S001.

The processing in respective steps illustrated in FIGS. 3 and 5 constitutes function portions for performing respective functions. For example, step S004 in FIG. 5 corresponds to a set temperature evaluation portion. Step S005 corresponds to an air blowing volume evaluation portion. Step S006 corresponds to an inside-outside air evaluation portion. Step S007 corresponds to a compressor power evaluation portion. Step S008 corresponds to an air blowing mode evaluation portion. Step S009 corresponds to a power saving mode evaluation portion. Step S010 corresponds to an ecological driving evaluation portion. Steps S011 and S012 correspond to a notification portion.

According to the present embodiment, at the time of a change of the set temperature Tset, the air conditioning control unit 50 shifts the set temperature evaluation value TAOJG to the positive side from a value determined prior to the change of the set temperature Tset even without decrease in power consumption of the vehicular air conditioner 10 in accordance with the change of the set temperature Tset when the change of the set temperature Tset is a change for raising the level of power saving as illustrated in FIG. 6. Accordingly, an operation performed by the occupant 48 to achieve power saving of the vehicular air conditioner 10 can be evaluated.

In addition, an occupant's operation aiming to achieve power saving can be evaluated based on a change of the set temperature evaluation value TAOJG even when the occupant's operation associated with the set temperature Tset does not immediately decrease power consumption of the vehicular air conditioner 10. For example, an occupant's operation directed to achieve power saving of the vehicular air conditioner 10 can be urged in this manner. Accordingly, an index indicating a level of energy saving of air conditioning is presented to the occupant 48 as a user to urge the occupant 48 to perform air conditioning operation achieving high-level energy saving and high fuel efficiency.

According to the present embodiment, at the time of a change of the set temperature Tset to a higher temperature in the maximum cooling state of the vehicular air conditioner 10, the air conditioning control unit 50 shifts the set temperature evaluation value TAOJG toward the positive side from a value determined prior to the change of the set temperature Tset, even in the state where the maximum cooling state is maintained without decrease in power consumption of the vehicular air conditioner 10 in accordance with the change of the set temperature Tset. Accordingly, an occupant's operation for achieving power saving of the vehicular air conditioner 10 can be urged based on the change of the set temperature evaluation value TAOJG in the maximum cooling state as a specific example that may produce no decrease in power consumption of the vehicular air conditioner 10 in accordance with a change of the set temperature Tset.

According to the present embodiment, at the time of a change of the set temperature Tset to a lower temperature in the maximum heating state of the vehicular air conditioner 10, the air conditioning control unit 50 shifts the set temperature evaluation value TAOJG toward the positive side from a value determined prior to the change of the set temperature Tset, even in the state where the maximum heating state condition is maintained without decrease in the power consumption of the vehicular air conditioner 10 in accordance with the change of the set temperature Tset. Accordingly, execution of an occupant's operation for achieving power saving of the vehicular air conditioner 10 can be urged based on the change of the set temperature evaluation value TAOJG in the maximum heating state as a specific example that may produce no decrease in power consumption of the vehicular air conditioner 10 by a change of the set temperature Tset.

According to the present embodiment, the ecological driving evaluation value ACECOJG is determined based on the individual evaluation value group including the set temperature evaluation value TAOJG, the air blowing volume evaluation value VMJG, the inside-outside air evaluation value RFJG, the compressor power evaluation value ACJG, the air blowing mode evaluation value SFLJG, and the power saving mode evaluation value ECOJG. Accordingly, the level of power saving of the vehicular air conditioner 10 is more accurately reflected in the grade of the ecological evaluation value ACECOJG than in a configuration that determines the ecological driving evaluation value ACECOJG based on only the set temperature evaluation value TAOJG.

According to the present embodiment, the weight given to the set temperature evaluation value TAOJG is the largest in the individual evaluation value group including the plurality of individual evaluation values TAOJG to ECOJG. In this manner, the weights given to the respective individual evaluation values TAOJG to ECOJG are matched with the degrees of reflection of power saving of the vehicular air conditioner 10 in the respective individual evaluation values TAOJG to ECOJG.

According to the present embodiment, the weight of the inside-outside air evaluation value RFJG is the smallest in the individual evaluation value group. In this manner, the weights given to the respective individual evaluation values TAOJG to ECOJG are similarly matched with the degrees of reflection of power saving of the vehicular air conditioner 10 in the respective individual evaluation values TAOJG to ECOJG.

According to the present embodiment, the compressor power evaluation value ACJG is included in the individual evaluation value group as one of the plurality of individual evaluation values TAOJG to ECOJG. Accordingly, the power consumption Wcm of the compressor 12, which is unlikely to become an item directly associated with an occupant's operation but considerably affects the level of power saving of the vehicular air conditioner 10, is allowed to be taken into consideration in determining the ecological driving evaluation value ACECOJG.

According to the present embodiment, the maximum values of the plurality of individual evaluation values TAOJG to ECOJG as limits on the positive side of the variation ranges of the respective individual evaluation values TAOJG to ECOJG are equalized with each other. Accordingly, as expressed by formula F2, weighting for each of the individual evaluation values TAOJG to ECOJG is easily achievable by multiplying the plurality of individual evaluation values TAOJG to ECOJG by the coefficients $\alpha$ to $\zeta$ corresponding to the quantities of the weighting.

According to the present embodiment, the variation range of the set temperature evaluation value TAOJG includes not only the positive range that extends from zero toward the positive side, but also the negative range that extends from zero to the negative side. Accordingly, unlike a variation range of the set temperature evaluation value TAOJG not including a negative range, the weight given to the set temperature evaluation value TAOJG for determining the ecological driving evaluation value ACECOJG can be further raised while equalizing the upper limit of the variation range of the set temperature evaluation value TAOJG with the upper limits of the variation ranges of the individual evaluation values other than the set temperature evaluation value TAOJG.

According to the present embodiment, the variation range of the set temperature evaluation value TAOJG is defined by the positive side range and the negative side range divided at the center of zero. Accordingly, weighting of the set temperature evaluation value TAOJG can be easily compared with weighting of the individual evaluation values other than the set temperature evaluation value TAOJG.

According to the embodiment described above, the vehicular air conditioner 10 is mounted on a hybrid vehicle. However, the types of vehicle on which the vehicular air conditioner 10 is mounted are not limited to particular types. For example, the vehicular air conditioner 10 may be mounted on an engine vehicle including no motor for traveling, or an electric car.

According to the embodiment described above, the compressor 12 of the vehicular air conditioner 10 is an electric type compressor. However, the compressor 12 may be an engine driving type compressor operated by an engine.

According to the embodiment described above, the allowable maximum rotation speed of the compressor 12 in the eco-mode is reduced to a speed lower than that speed in the non-eco-mode. Alternatively, the capacity of the compressor 12 in the eco-mode may be reduced to a capacity smaller than that capacity in the non-eco-mode, for example.

According to the embodiment described above, the power consumption Wcm of the compressor 12 as an item for determining the compressor power evaluation value ACJG is calculated as a value equivalent to power consumption of the electric motor 121 included in the compressor 12. However, the power consumption Wcm may be calculated by other methods. For example, the power consumption Wcm of the compressor 12 may be calculated based on the rotation speed of the compressor 12 and torque for driving a compression mechanism included in the compressor 12. According to this calculation method, the power consumption Wcm of the compressor 12 can be calculated even when the compressor 12 is an engine driving type compressor. The torque for driving the compression mechanism included in the compressor 12 may be detected by a torque sensor, or based on pressure of refrigerant sucked by the compressor 12 and pressure of refrigerant discharged from the compressor 12 with reference to a map established beforehand.

As expressed by formula F2 in the embodiment described above, the ecological driving evaluation value ACECOJG is determined based on the plurality of individual evaluation values TAOJG to ECOJG. However, all of the plurality of individual evaluation values TAOJG to ECOJG are not necessarily required. For example, the ecological driving evaluation value ACECOJG may be determined based on at least the set temperature evaluation value TAOJG included in the plurality of individual evaluation values TAOJG to ECOJG.

Alternatively, the ecological driving evaluation value ACECOJG may be determined based on the set temperature evaluation value TAOJG, and any or all of the air blowing volume evaluation value VMJG, the inside-outside air evaluation value RFJG, the compressor power evaluation value ACJG, the air blowing mode evaluation value SFLJG, and the power saving mode evaluation value ECOJG.

According to the embodiment described above, the ecological driving evaluation value ACECOJG is displayed on the display device 52 in FIG. 1 in step S011 in FIG. 5. However, the display device 52 is not an essential component, and may be eliminated as long as notification of the ecological driving evaluation value ACECOJG can be given to the occupant 48. For example, the occupant 48 may be notified in voices.

According to the embodiment described above, display of the ecological driving evaluation value ACECOJG is switchable to non-evaluation display in step S012 illustrated in FIG. 5. However, display of the ecological driving evaluation value ACECOJG on the display device 52 illustrated in FIG. 1 may be eliminated in step S012, for example.

According to the embodiment described above, the level of power saving of the vehicular air conditioner 10 rises as each of the ecological driving evaluation value ACECOJG and the plurality of individual evaluation values TAOJG to ECOJG shifts further toward the positive side. However, the level of power saving may rise as each of these values shifts further toward the negative side. In other words, it is only required that the high level side of power saving is set to be the same side of either the positive side or the negative side for all of the ecological driving evaluation value ACECOJG and the plurality of individual evaluation values TAOJG to ECOJG.

According to the embodiment described above, the vehicular air conditioner 10 includes the heater core. However, the heater core is not an essential component, and may be eliminated from the vehicular air conditioner 10. When the heater core is eliminated from the vehicular air conditioner 10, the refrigerating cycle included in the vehicular air conditioner 10 is configured to perform heating as well as cooling, for example. In this case, heating operation of the vehicular air conditioner 10 is achieved by using the refrigerating cycle.

According to the embodiment described above, the ecological driving evaluation value ACECOJG is determined by using formula F2 that is presented by way of example. The ecological driving evaluation value ACECOJG may be determined by using calculation formulas other than formula F2, or with reference to maps.

According to the embodiment described above, the processing in the respective steps illustrated in flowcharts in FIGS. 3 and 5 is performed under a computer program. However, this processing may be constituted by hard logic.

The present disclosure is not limited to the embodiments described herein, but may be practiced with various modifications. Needless to say, the elements constituting the embodiment are not necessarily essential unless clearly expressed as particularly essential, or considered as obviously essential in principle, for example. Values such as numbers of the constituent elements, numerical values, quantities, and ranges in the embodiment are not limited to the specific values described herein unless clearly expressed as particularly essential, or considered as obviously limited to the specific values in principle, for example. The materials, shapes, positional relationships or other conditions of the constituent elements and the like described in the embodiment are not limited to specific materials, shapes, positional relationships or other conditions unless clearly expressed, or limited to the specific materials, shapes, positional relationships or other conditions in principle.

According to a first aspect described in a part or the whole of the embodiment, when a set temperature is changed, and the change of the set temperature causes increase in power saving even without decrease in power consumption of the vehicular air conditioner, a set temperature evaluation portion changes a set temperature evaluation value on one side (in one direction) from a value prior to the change of the set temperature.

According to a second aspect, when the set temperature is changed to a higher temperature in a maximum cooling state of the vehicular air conditioner without decrease in power consumption of the vehicular air conditioner, the set temperature evaluation portion changes the set temperature evaluation value in the one of positive and negative directions from a value which is determined before the set temperature is changed. Accordingly, an occupant's operation for achieving power saving of the vehicular air conditioner can be urged based on the change of the set temperature evaluation value in the maximum cooling state of the vehicular air conditioner as a specific example that may produce no decrease in power consumption of the vehicular air conditioner in accordance with a change of the set temperature.

According to a third aspect, when the set temperature is changed to a lower temperature in a maximum heating state of the vehicular air conditioner without decrease in power consumption of the vehicular air conditioner, the set temperature evaluation portion changes the set temperature evaluation value in the one of positive and negative directions from a value which is determined before the set temperature is changed. Accordingly, execution of an occupant's operation for achieving power saving of the vehicular air conditioner can be urged based on the change of the set temperature evaluation value in the maximum heating state of the vehicular air conditioner as a specific example that may produce no decrease in power consumption of the vehicular air conditioner in accordance with a change of the set temperature.

According to a fourth aspect, an ecological driving evaluation portion determines an ecological driving evaluation value based on an individual evaluation value group that include the set temperature evaluation value, and any or all of an air blowing volume evaluation value, an inside-outside evaluation value, a compressor power evaluation value, an air blowing mode evaluation value, and a power saving mode evaluation value. Accordingly, the level of power saving of the vehicular air conditioner is more accurately reflected in the grade of the ecological driving evaluation value than in a configuration that determines the ecological driving evaluation value based on only the set temperature evaluation value.

According to a fifth aspect, a largest weight in the individual evaluation value group is given to the set temperature evaluation value. In this manner, the weights given to the respective individual evaluation values are matched with the degrees of reflection of power saving of the vehicular air conditioner in the respective individual evaluation values.

According to a sixth aspect, a smallest weight in the individual evaluation value group is given to the inside-outside evaluation value. In this manner, the weights given to the respective individual evaluation values are similarly matched with the degrees of reflection of power saving of the vehicular air conditioner in the respective individual evaluation values.

According to a seventh aspect, the compressor power evaluation value is included in the individual evaluation value group as one of the plurality of individual evaluation values. Accordingly, the power consumption of the compressor, which is unlikely to become an item directly associated with an occupant's operation but considerably affects the level of power saving of the vehicular air conditioner, is allowed to be taken into consideration in determining the ecological driving evaluation value.

According to an eighth aspect, the maximum values (limit values) of the plurality of individual evaluation values as limits on the one side of the variation ranges of the respective individual evaluation values are equalized with each other. Accordingly, weighting for each of the individual evaluation values is easily achievable by multiplying the plurality of individual evaluation values by coefficients corresponding to the quantities of the weighting.

According to a ninth aspect, the variation range of the set temperature evaluation value includes not only a range that extends in the one direction from zero, but also a range that extends in a direction opposite to the one direction. Accordingly, unlike a variation range of the set temperature evaluation value not including a range on the other side, the weight given to the set temperature evaluation value for determining the ecological driving evaluation value can be further raised.

According to a tenth aspect, the variation range of the set temperature evaluation value is constituted by the one side range and the other side range divided at the center of zero. Accordingly, weighting of the set temperature evaluation value can be easily compared with weighting of the individual evaluation values other than the set temperature evaluation value.

Although the present disclosure has been fully described in connection with the embodiments thereof, it is to be noted that various changes and modifications will become apparent to those skilled in the art. Moreover, other combinations and configurations, including more, less or only a single element, are also within the spirit and scope of the present disclosure.

What is claimed is:

1. An evaluation device for evaluating an operation of a vehicular air conditioner performed by an occupant, the vehicular air conditioner conditioning air inside a vehicle compartment, the evaluation device comprising:
   a set temperature evaluation portion configured to determine a set temperature evaluation value which is an index indicating a level of power saving of the vehicular air conditioner, based on a set temperature that is set as a target value of an inside air temperature by the occupant;

an ecological driving evaluation portion configured to determine an ecological driving evaluation value which is the index indicating the level of power saving, based on at least the set temperature evaluation value; and a notification portion configured to control a notification device to notify the occupant of the ecological driving evaluation value, wherein the level power saving rises with changes of the set temperature evaluation value or the ecological driving evaluation value in one of a positive value direction or a negative value direction, when the set temperature is changed, and the change of the set temperature causes increase of the level of power saving without decrease in power consumption of the vehicular air conditioner, the set temperature evaluation portion changes the set temperature evaluation value in the one of positive and negative directions from a value which is determined before the set temperature is changed, the ecological driving evaluation portion determines the ecological driving evaluation value based on an individual evaluation value group that includes a plurality of individual evaluation values, and the plurality of individual evaluation values include the set temperature evaluation value and some or all of an air blowing volume evaluation value determined as an index of the level of power saving based on an air blowing volume of air blown from the vehicular air conditioner into the vehicle compartment, an inside-outside air evaluation value determined as an index of the level of power saving based on which of inside air and outside air is introduced into the vehicular air conditioner, a compressor power evaluation value determined as an index of the level of power saving based on power consumption of a compressor included in the vehicular air conditioner, an air blowing mode evaluation value determined as an index of the level of power saving based on whether air blown from the vehicular air conditioner is focused on a predetermined specific region inside the vehicle compartment, and a power saving mode evaluation value determined as an index of the level of power saving based on whether a predetermined power saving driving mode is selected, the vehicular air conditioner saving power in the power saving driving mode compared to a predetermined standard operation mode.

2. The evaluation device according to claim 1, wherein when the set temperature is changed to a higher temperature in a maximum cooling state of the vehicular air conditioner without decrease in power consumption of the vehicular air conditioner, the set temperature evaluation portion changes the set temperature evaluation value in the one of the positive value direction or the negative value direction from a value which is determined before the set temperature is changed.

3. The evaluation device according to claim 1, wherein when the set temperature is changed to a lower temperature in a maximum heating state of the vehicular air conditioner without decrease in power consumption of the vehicular air conditioner, the set temperature evaluation portion changes the set temperature evaluation value in the one of the positive value direction or the negative value direction from a value which is determined before the set temperature is changed.

4. The evaluation device according to claim 1, wherein each of the plurality of individual evaluation values of the individual evaluation value group is weighted, and a largest weight in the individual evaluation value group is given to the set temperature evaluation value.

5. The evaluation device according to claim 4, wherein the plurality of individual evaluation values of the individual evaluation value group include the inside-outside air evaluation value, and a smallest weight in the individual evaluation value group is given to the inside-outside air evaluation value.

6. The evaluation device according to claim 4, wherein the plurality of individual evaluation values of the individual evaluation value group include the compressor power evaluation value.

7. The evaluation device according to claim 4, wherein the level of power saving rises with change of any one of the plurality of individual evaluation values in the one of the positive value direction or the negative value direction, each of variation ranges of the plurality of individual evaluation values includes zero, and limit values of the plurality of individual evaluation values are same as each other, the limit values being limits of the variation ranges of the plurality of individual evaluation values in the one of the positive value direction or the negative value direction.

8. The evaluation device according to claim 7, wherein the set temperature evaluation portion determines the set temperature evaluation value within a predetermined variation range of the set temperature evaluation value, and the variation range of the set temperature evaluation value includes a range that extends in the one of the positive value direction or the negative value direction from zero, and a range that extends in another direction opposite to the one of the positive value direction or the negative value direction from zero.

9. The evaluation device according to claim 7, wherein a center value of the variation range of the set temperature evaluation value is zero.

10. An ecological vehicle air conditioner evaluation device for evaluation an operation of a vehicular air conditioner performed by an occupant, the vehicular air conditioner conditioning air inside a vehicle compartment, the ecological vehicle air conditioner evaluation device comprising:

at least one processor configured to:

determine a set temperature evaluation value that is an index indicating a level of power saving of the vehicular air conditioner, based on a set temperature that is set as a target value of an inside air temperature by the occupant;

determine an ecological driving evaluation value that is the index indicating the level of power saving, based on the set temperature evaluation value and an individual evaluation value group that includes a plurality of individual evaluation values; and control a notification device to notify the occupant of the ecological driving evaluation value, wherein the level of power saving rises with changes of the set temperature evaluation value or the ecological driving evaluation value in one of a positive value direction or a negative value direction, in response to the set temperature being changed where the change causes an increase of the level of power saving without a decrease in power consumption of the vehicular air conditioner, the processor is further configured to change the set temperature evaluation value in one of the positive value direction or the negative value direction from a value that is determined before the set temperature is changed, and the plurality of individual evaluation values include the set temperature evaluation value and some or all of
- an air blowing volume evaluation value determined as an index of the level of power saving based on an air blowing volume of air blown from the vehicular air conditioner into the vehicle compartment,
- an inside-outside air evaluation value determined as an index of the level of power saving based on which of inside air and outside air is introduced into the vehicular air conditioner,
- a compressor power evaluation value determined as an index of the level of power saving based on power consumption of a compressor included in the vehicular air conditioner,
- an air blowing mode evaluation value determined as an index of the level of power saving based on whether air blown from the vehicular air conditioner is focused on a predetermined specific region inside the vehicle compartment, and
- a power saving mode evaluation value determined as an index of the level of power saving based on whether a predetermined power saving driving mode is selected, the vehicular air conditioner configured to save power in the power saving driving mode compared to a predetermined standard operation mode.

11. The evaluation device of claim 10, wherein
in response to the set temperature being changed to a higher temperature in a maximum cooling state of the vehicular air conditioner without the decrease in the power consumption of the vehicular air conditioner, the at least one processor is further configured to change the set temperature evaluation value in the one of the positive value direction or the negative value direction from a value that is determined before the set temperature is changed.

12. The evaluation device of claim 10, wherein
in response the set temperature being changed to a lower temperature in a maximum heating state of the vehicular air conditioner without the decrease in the power consumption of the vehicular air conditioner, the at least one processor is further configured to change the set temperature evaluation value in the one of the positive value direction or the negative value direction from a value that is determined before the set temperature is changed.

13. The evaluation device of claim 10, wherein
each of the plurality of individual evaluation values of the individual evaluation value group is weighted, and
a largest weight in the individual evaluation value group is given to the set temperature evaluation value.

14. The evaluation device of claim 13, wherein
the plurality of individual evaluation values of the individual evaluation value group include the inside-outside air evaluation value, and
a smallest weight in the individual evaluation value group is given to the inside-outside air evaluation value.

15. The evaluation device of claim 13, wherein
the plurality of individual evaluation values of the individual evaluation value group include the compressor power evaluation value.

16. The evaluation device of 14, wherein
the level of power saving rises with change of any one of the plurality of individual evaluation values in the one of the positive value direction or the negative value direction,
each of variation ranges of the plurality of individual evaluation values includes zero, and
limit values of the plurality of individual evaluation values are same as each other, the limit values being limits of the variation ranges of the plurality of individual evaluation values in the one of the positive value direction or the negative value direction.

17. The evaluation device of claim 16, wherein
the at least one processor is further configured to determine the set temperature evaluation value within a predetermined variation range of the set temperature evaluation value, and
the variation range of the set temperature evaluation value includes a range that extends in the one of the positive value direction or the negative value direction from zero, and a range that extends in another direction opposite to the one of the positive value direction or the negative value direction from zero.

18. The evaluation device of claim 16, wherein
a center value of the variation range of the set temperature evaluation value is zero.

* * * * *